United States Patent
Johansson et al.

(10) Patent No.: US 9,661,546 B2
(45) Date of Patent: May 23, 2017

(54) DYNAMIC OFFLOAD SELECTION IN MOBILE COMMUNICATION SYSTEMS

(71) Applicant: MEDIATEK INC., Hsinchu (TW)

(72) Inventors: Per Johan Mikael Johansson, Kungsangen (SE); Chia-Chun Hsu, New Taipei (TW); Yu-Syuan Jheng, Taipei (TW); Aimin Justin Sang, San Diego, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/607,420

(22) Filed: Jan. 28, 2015

(65) Prior Publication Data

US 2015/0215839 A1   Jul. 30, 2015

Related U.S. Application Data

(60) Provisional application No. 61/932,825, filed on Jan. 29, 2014.

(51) Int. Cl.
*H04W 4/00*   (2009.01)
*H04W 36/30*   (2009.01)
(Continued)

(52) U.S. Cl.
CPC ............ *H04W 36/30* (2013.01); *H04W 36/14* (2013.01); *H04W 84/12* (2013.01)

(58) Field of Classification Search
CPC ...... H04W 36/30; H04W 36/14; H04W 84/12
(Continued)

(56) References Cited

U.S. PATENT DOCUMENTS

| 7,664,492 B1 * | 2/2010 | Lee ................. H04W 16/28 455/422.1 |
| 2004/0176024 A1 | 9/2004 | Hsu et al. .................. 455/3.04 |

(Continued)

FOREIGN PATENT DOCUMENTS

| CN | 102711184 A | 6/2012 |
| CN | 102917406 A | 8/2012 |

(Continued)

OTHER PUBLICATIONS

International Search Report and Written Opinion of International Search Authority for PCT/CN2015/071821 dated Apr. 29, 2015(12 pages).

(Continued)

*Primary Examiner* — Charles Shedrick
(74) *Attorney, Agent, or Firm* — Imperium Patent Works; Zheng Jin; Mark Marrello (57) ABSTRACT

A method of offload selection for a UE to select between 3GPP RAT and WLAN cell is provided. The UE receives configuration information that applies to selecting WLAN or 3GPP radio access technology (RAT). The UE determines if the UE may perform WLAN offload by evaluating 3GPP radio access network (RAN) conditions where at least one RAN condition is related to a radio signal strength or a radio signal quality in 3GPP RAT. The UE then determines if there is at least one suitable WLAN cell by evaluating WLAN conditions. The UE also determines if there is candidate traffic for WLAN offload. Finally, the UE steers the determined traffic to WLAN if the UE may perform WLAN offload and if there is at least one suitable WLAN cell. Otherwise, the UE steers the determined traffic to 3GPP RAT.

21 Claims, 7 Drawing Sheets

(51) Int. Cl.
*H04W 84/12* (2009.01)
*H04W 36/14* (2009.01)

(58) Field of Classification Search
USPC ................. 370/235, 252, 331; 455/426.1
See application file for complete search history.

(56) References Cited

U.S. PATENT DOCUMENTS

| | | | | |
|---|---|---|---|---|
| 2007/0091844 A1* | 4/2007 | Huang | ................. | H04W 36/24 370/331 |
| 2008/0014957 A1* | 1/2008 | Ore | ................. | H04W 36/0088 455/452.1 |
| 2011/0182273 A1* | 7/2011 | George | ................. | H04W 36/14 370/338 |
| 2012/0110128 A1 | 5/2012 | Aaron et al. | ................. | 709/219 |
| 2013/0265879 A1 | 10/2013 | Qiang | ................. | 370/235 |
| 2013/0322238 A1* | 12/2013 | Sirotkin | ................. | H04W 28/0247 370/230 |
| 2013/0339515 A1* | 12/2013 | Radhakrishnan | ..... | H04L 41/142 709/224 |
| 2014/0003239 A1 | 1/2014 | Etemad et al. | ................. | 370/235 |
| 2014/0036705 A1 | 2/2014 | Ma | ................. | 370/252 |
| 2014/0071942 A1 | 3/2014 | Ye | ................. | 370/331 |
| 2014/0133304 A1* | 5/2014 | Pica | ................. | H04W 48/20 370/232 |
| 2014/0153511 A1* | 6/2014 | Sirotkin | ................. | H04W 72/0486 370/329 |
| 2014/0153546 A1* | 6/2014 | Kim | ................. | H04W 48/18 370/332 |
| 2014/0200008 A1* | 7/2014 | Wang | ................. | H04W 36/38 455/438 |
| 2015/0111569 A1* | 4/2015 | Gupta | ................. | H04W 4/22 455/426.1 |

FOREIGN PATENT DOCUMENTS

| | | |
|---|---|---|
| CN | 103686902 A | 9/2012 |
| WO | WO2004077753 A2 | 9/2004 |

OTHER PUBLICATIONS

EPO, Search Report for the EP patent application 15743130.5 dated Feb. 7, 2017 (14 pages).
3GPP TR 37.834 V12.0.0 (Dec. 2013), 3rd Generation Partnership Project; Technical specification Group Radio access Network; Study on Wireless Local Area Network (WLAN)—3GPP radio interworking (Release 12).

* cited by examiner

DYNAMIC OFFLOAD SELECTION IN MOBILE COMMUNICATION SYSTEMS

CROSS REFERENCE TO RELATED APPLICATIONS

This application claims priority under 35 U.S.C. §119 from U.S. Provisional Application No. 61/932,825, entitled "Offload Selection," filed on Jan. 29, 2014; the subject matter of which is incorporated herein by reference.

TECHNICAL FIELD

The disclosed embodiments relate generally to wireless network communication, and, more particularly, to functionality for the interwork of Cellular wireless communication and Wireless Local Area Network Communication (WLAN, also called WiFi).

BACKGROUND

To meet the fast growing demand in mobile data service, various network operators are developing new technologies and defining new standards for the next generation wireless networks to achieve much higher peak transmission rate. For example, 1 Gbps peak transmission rate is required by ITU-R for IMT-Advanced systems in the $4^{th}$ generation ("4G") mobile communications systems. 1 Gbps peak transmission rate in wireless networks can provide users similar experience as in wireline networks, and it is sufficient to satisfy most applications on the Internet today and in the near future.

While peak transmission rate is no longer a critical problem after 4G era, network capacity is likely to be exhausted very soon in the next few years. Not only traffic demand is growing dramatically (i.e., >50× in 5 years), but also the improvement on average cell spectral efficiency is very limited from 3G to 4G era (i.e., <10×). In addition, the available spectrum resource is also limited. Network capacity will still be exhausted very soon even all the networks are upgraded with 4G air interface. This problem in fact already happens in some areas. Therefore, capacity exhaustion is anticipated to be the most critical problem.

While the demand on wireless communication service continues to increase, the demand on broadband access may not always require mobility support. In fact, studies have shown that only a small fraction of users demand on simultaneous mobile and broadband access. Therefore, in addition to cellular networks, there are other networks able to deliver information to mobile users, with or without mobility support. In most geographic areas, multiple radio access networks (RANs) such as E-UTRAN and WLAN are usually available. Furthermore, wireless communication devices are increasingly being equipped with multiple radio transceivers for accessing different radio access networks. For example, a multiple radio terminal (MRT) may simultaneously include Bluetooth, WiMAX, and WiFi radio transceivers. Thus, multi-radio integration becomes more feasible today and is the key to help user terminals to explore more bandwidth available from different radio access technologies and achieve better utilization of scarce radio spectrum resources.

There is currently no specified prior art that performs traffic offload to WiFi for a cellular UE that takes cellular load into account, or gives the Cellular Radio Access Network the possibility to control to what extent traffic of UEs in a certain cell is offloaded to WiFi. Furthermore, it is currently not possible for the Cellular RAN to identify and pick particular UEs for traffic offload to WiFi.

The current art for WiFi offload, for example, 3GPP ANDSF assumes various level of support for traffic offload. All traffic of a UE, all traffic towards a certain APN, or individual IP flows can be offloaded. A requirement is that even though offload to WiFi is being done, it shall be possible to keep some traffic on Cellular, e.g. real-time critical traffic, certain IMS traffic, emergency call. Another requirement is that it shall be possible to do load dependent or RAN controlled offloading without ANDSF framework. A problem then is that offloading should preferably be done on APN or IP flow level, but in the current 3GPP architecture, the RAN has no knowledge of APNs or IP flows.

SUMMARY

It is an objective to specify a novel UE procedure for dynamic selection of 3GPP RAT or WLAN Cell for traffic offload, which allows taking into account dynamic network load and radio conditions.

In one embodiment, a method of offload selection for a UE to select between 3GPP RAT and WLAN cell is provided. The UE receives configuration information that applies to selecting WLAN or 3GPP radio access technology (RAT). The UE determines if the UE may perform WLAN offload by evaluating 3GPP radio access network (RAN) conditions where at least one RAN condition is related to a radio signal strength or a radio signal quality in 3GPP RAT. The UE then determines if there is at least one suitable WLAN cell by evaluating WLAN conditions. The UE also determines if there is candidate traffic for WLAN offload. Finally, the UE steers the determined traffic to WLAN if the UE may perform WLAN offload and if there is at least one suitable WLAN cell. Otherwise, the UE steers the determined traffic to 3GPP RAT.

In one embodiment, the configuration information comprises at least one of a first threshold indicating a first 3GPP RAN condition, a second threshold indicating a second 3GPP RAN condition, a third threshold of a randomly generated number, a fourth threshold indicating a first WLAN condition, a fifth threshold indicating a second WLAN condition, a sixth threshold indicting a WLAN load, and a seventh threshold indicating a minimum estimated throughput. The configuration information further comprises at least one of a first predefine period of time indicating a minimum time the UE remains a candidate for WLAN offload, a second predefined period of time indicating a minimum time the UE remains a non-candidate for WLAN offload, a third predefined time for determining if a WLAN cell is suitable when the UE has a high or medium speed, and a fourth predefined time indicating a minimum time a WLAN cell remains suitable.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
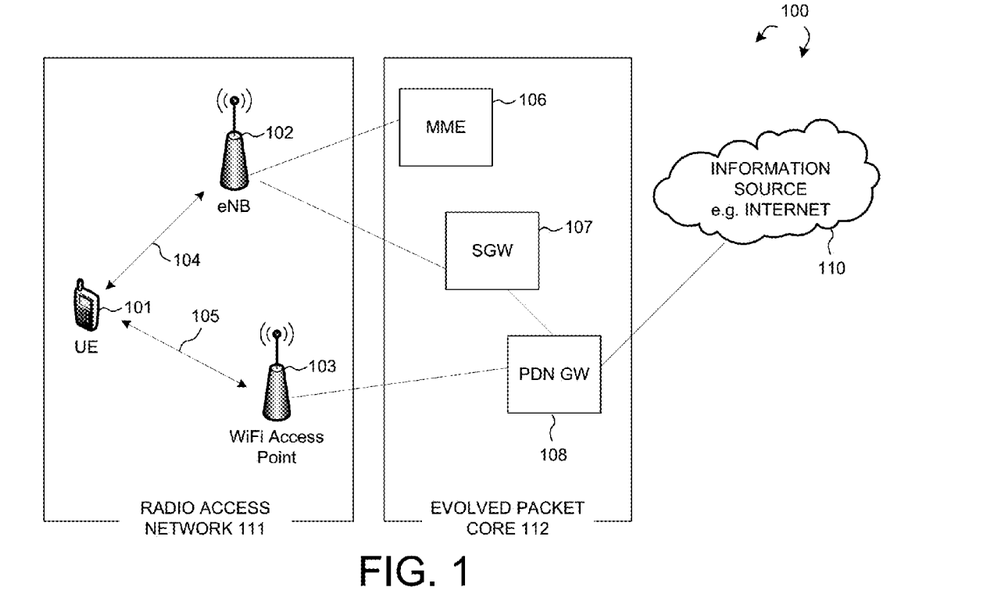
FIG. 1 illustrates a mobile communication network with offload selection in accordance with one novel aspect.

FIG. 1 illustrates a mobile communication network 100 with offload selection in accordance with one novel aspect. A radio access network (RAN) is part of a mobile telecommunication system implementing a radio access technology. In most geographic areas, multiple radio access networks are usually available for user equipment UE 101 to access information source 110 (e.g., the Internet) and obtain mobile data service. Examples of different radio access network types are GSM radio access network, UTRA or E-UTRA cellular access network, WiMAX system, and Wireless Local Area Network (WLAN, also called WiFi). If the multiple RANs support the same air interface, then the entire access network is a homogeneous network. On the other hand, if the multiple RANs support different air interfaces (e.g. cellular and WLAN), then the entire access network is a heterogeneous network. From UE point of view, it does not matter which access network the desired information is delivered through, as long as data service is maintained with fast speed and high quality.

Mobile communication network 100 comprises a radio access network RAN 111 and an evolved packet core network 112. RAN 111 comprises an E-UTRAN including eNB 102 and a WLAN including a WiFi AP 103, and each RAN provides radio access for user equipment UE 101 via different radio access technology (RAT) and air interfaces. The evolved packet core network 112 comprises a mobility management entity (MME) 106, a serving gateway (S-GW) 107, and a packet data network gateway (PDN-GW) 108. Evolved packet core network 112 and E-UTRAN together is also referred to as a public land mobile network (PLMN). From UE 101 perspective, it is equipped with both a cellular transceiver and a WLAN/WiFi transceiver, and is able to access the Internet 110 via cellular access or WLAN access.

UE 101 is attached to the public land mobile network (PLMN) and maintains a communication association with the Mobility Management Entity MME 106. UE 101 may be camping on 3GPP Cell 104 in RRC_Idle mode or UE 101 may be connected to 3GPP Cell 104 in RRC_Connected mode. There could also be cases when UE 101 is connected to the Radio Access Network RAN 111 by more than one cell. In this exemplary figure, a 3GPP Long Term Evolution (LTE) and 3GPP Enhanced packet core (EPS) network is illustrated. Another applicable scenario is a 3GPP Universal Mobile Telephony System (UMTS) network. UE 101 furthermore is receiving signals from or communicating with at least one WiFi Access point 103, by at least one WiFi cell 105. In this document, the notation WLAN/WiFi cell 105 is used, meaning the communication link or potential communication link that is established between the UE 101 and the WLAN/WiFi Access Point 103. Operator WiFi access can be integrated into 3GPP Core Network in various ways. The example shows the possibility that the WiFi connections and the 3GPP connections are using the same PDN gateway 108, which makes it possible to maintain IP address while moving between Cellular access 104 and WLAN access 105, which is also referred as a "seamless offload".

In one novel aspect, the cellular radio module and the WiFi radio module of UE 101 cooperates with each other to provide integrated Cellular and WiFi access over both E-UTRAN and WLAN to improve transmission efficiency and bandwidth utilization. A novel UE procedure for dynamic selection of Cellular access or WiFi access for traffic offload is proposed, which allows taking into account dynamic network load and radio conditions, addressing the limitations of current art.

Figure 2:
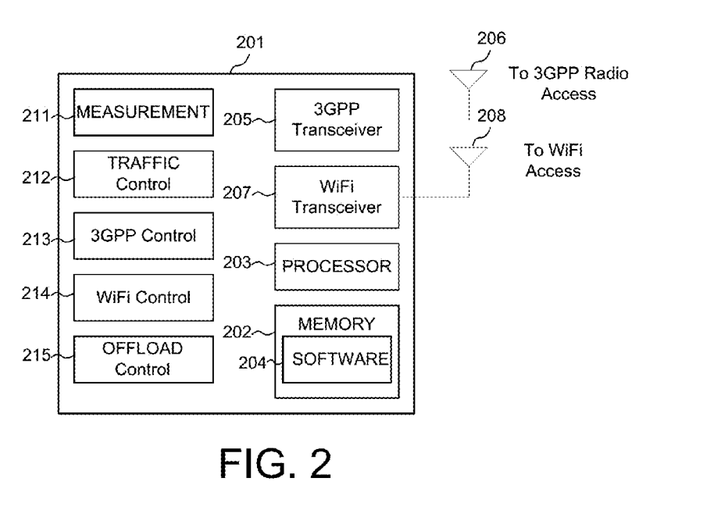
FIG. 2 illustrates a simplified block diagram of a UE that carry out embodiments of the invention.

FIG. 2 illustrates a simplified block diagram of a UE 201 that carries out certain embodiments of the present invention. UE 201 comprises memory 202 containing programming codes and data 204, a processor 203, a 3GPP transceiver 205 coupled to antenna 206, and a WiFi transceiver 206 coupled to antenna 207. In the transmitting direction, the transceiver converts received baseband signals from the processor to RF signals and sends out to the antenna. Similarly, in the receiving direction, the processor processes the received baseband signals from the transceiver and invoke different functional modules to be configured to perform various features and functions supported by UE 201.

UE 201 further comprises functional modules including measurement module 211, traffic control module 212, 3GPP control module 213, WiFi control module 214, and traffic offload control module 215. The different modules are functional modules that can be implemented in software, firmware, hardware, or any combination thereof. The function modules, when executed by processors 203 (via program codes 204 contained in memory 202), interwork with each other to carry out embodiments of the present invention. For example, measurement module 211 performs measurements on received radio signals, for both 3GPP and WiFi radio access technology. Traffic control module 212 determines which traffic is candidate for offload, 3GPP control module 213 evaluates 3GPP RAN conditions, WiFi control module 214 evaluates WiFi cell suitability, and traffic offload module 215 receives offload configuration from the network and determines whether, when, and how to perform WiFi offload accordingly.

Figure 3:
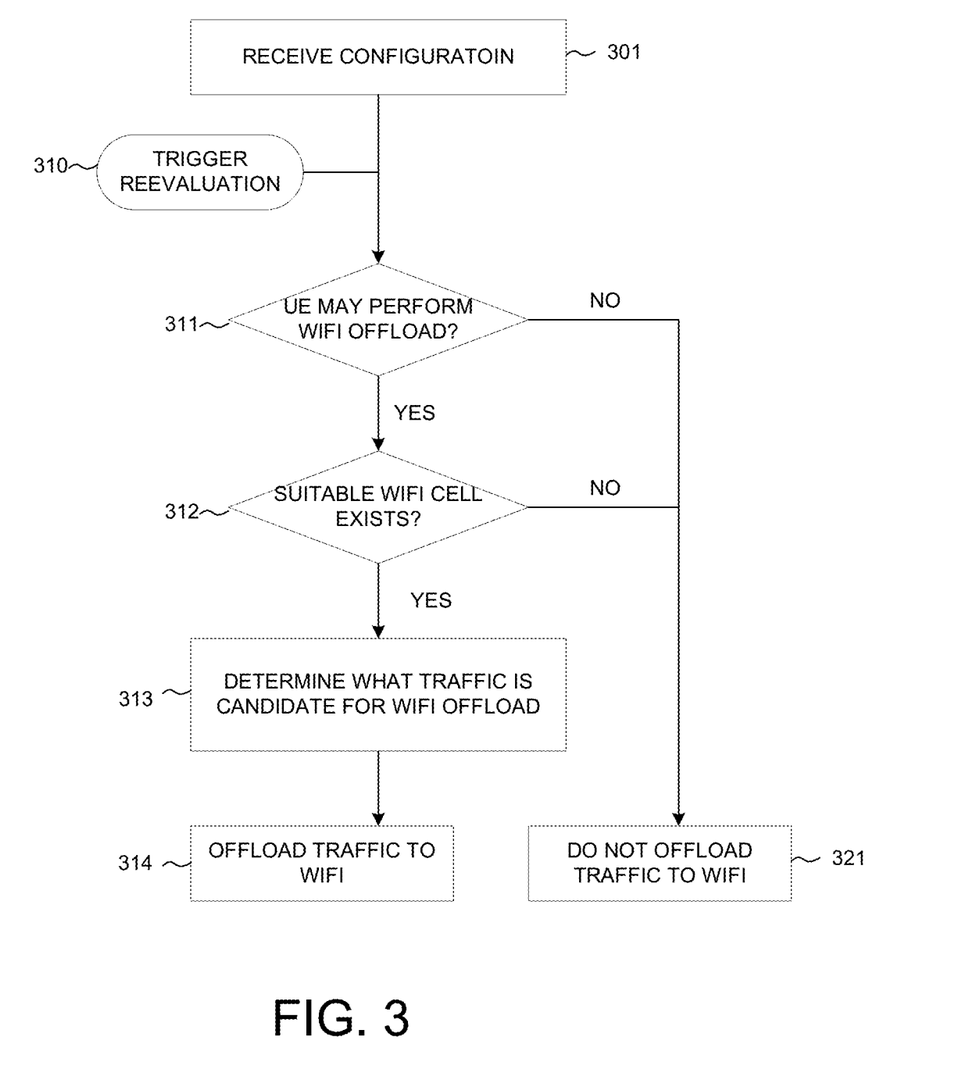
FIG. 3 illustrates a procedure of WiFi offload selection in accordance one novel aspect.

FIG. 3 illustrates a procedure of WiFi offload selection for a UE in accordance one novel aspect. In the example of FIG. 3, the UE first receives a configuration in step 301, with at least one dynamic parameter, for example a parameter that allows an eNB to regulate to what extent UEs in a cell are offloaded to WiFi. A new configuration can be received at any point in step 301. In addition, a dynamic part of the procedure is triggered regularly in step 310. Then it is checked whether the UE may perform WiFi offload, e.g., whether the UE may perform WiFi offload in step 311. Then it is checked if at least one suitable WiFi Cell exists in step 312. The conditions performed in steps 311 and 312 can be checked in any order. This means that the conditions can also be checked at the same time, i.e. they can be merged into a large condition. In case any of the conditions in step 311 or step 312 give result NO, then traffic should not be offloaded to WiFi, i.e. if offload is ongoing, then it should be stopped in step 321.

Otherwise, if both conditions in step 311 and 312 give result YES, then The UE then needs to determine which traffic can be offloaded to WiFi in step 313. This may depend on UE capability. Some UEs may have capability to only offload all traffic or no traffic. Other UEs may for example have capability to do offload per APN. Furthermore, the UE may perform the offload selection dependent on the actual traffic. For example, if there is no or very small data volumes that can currently be offloaded to WiFi, then offload to WiFi in step 320 may not be done even though the conditions in steps 311 and 312 have YES results. Finally, in step 314, the determined traffic is offloaded to WiFi. Note that in a realistic implementation there would be more steps than shown in the figure, e.g. a step to select a WiFi Cell in case there are several suitable cells.

Figure 4:
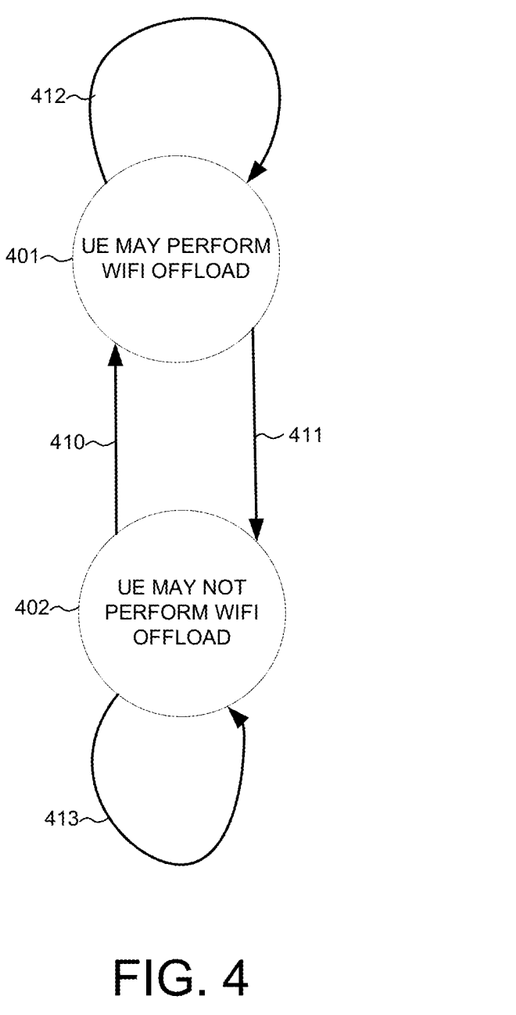
FIG. 4 illustrates a process of determining whether a UE may perform WiFi offload.

FIG. 4 illustrates a process of determining whether a UE may perform WiFi offload. FIG. 4 shows an example of how the UE could determine if it may perform WiFi offload, i.e., as a candidate for WiFi offload. In this example model, two states or two situations are modeled, either that the UE may perform WiFi offload (state 401), or that the UE may not perform WiFi offload (state 402). One possible way, to enable RAN control, is to use UE measurements of 3GPP radio signal strength or signal quality and compare the measured values towards a threshold value that is configured by the RAN. In one embodiment, the transition 410 would be triggered by UE received signal strength or signal quality from the 3GPP RAN<a first threshold. The benefit of such approach is that UEs in bad 3GPP radio conditions consuming large amount of radio resources are offloaded before UEs in good radio conditions that consumes less resources. If the threshold is configurable, then the 3GPP RAN could change the threshold when its load changes, and thus adapt the WiFi offload to its load. In another embodiment, the transition 411 would be triggered by the UE received signal strength or signal quality from the 3GPP RAN>a second threshold. The second threshold may be formed by the first threshold+a hysteresis value.

In order to prevent too fast transition between these two states or situations, several measures can be taken. The UE could be forced to stay in state 401 for at least a minimum time, e.g. a first predefined period of time. This could be modeled as the 412 state transition being active for this minimum time since entering state 401. Similarly, The UE could be forced to stay in state 402 for at least a minimum time, e.g. a second predefined period of time. This could be modeled as the 413 state transition being active for this minimum time since entering state 402. In one specific embodiment, the prevention of Ping-Pong between the two states could be supported by particular measurement filtering for the received signal strength or signal quality of the 3GPP network, which allows that the filtered measurements change more slowly. For example, the current Layer 3 filtering approach in 3GPP could be used. In another example, the concept of a time-to-trigger could be used, in which a measured quantity is considered above or below a threshold only after the UE has stayed above or below the threshold for a certain time-to-trigger period.

In one embodiment of FIG. 4, the state transition 410 or 411 would be triggered by a stochastic function where a random number is drawn and compared to a configured threshold, e.g., a third threshold. If the number is higher or lower than the third threshold, then the state transition 410 or 411 is triggered. NOTE that in this application, for simplicity, the process of determining if the UE may perform WiFi offload is in general described separately from the process of finding a suitable WiFi Cell. In a real implementation, however, these two processes may be merged, and other conditions could be taken into account when determining whether a UE may perform WiFi offload.

In a specific embodiment, a UE that considers itself moving with fast or medium speed through the cellular network but finds a WiFi cell that is consistently suitable. In such condition, The UE considers himself a candidate for WiFi offload and may perform WiFi offload. The benefit of such approach is that vehicular UEs with in-vehicle WiFi would always consider themselves a candidate for WiFi offload. A possibility to determine UE speed is to use the current 3GPP mobility state estimation (MSE) function, based on cell change counting. A possibility to determine whether a WiFi cell is consistently suitable is to apply a time condition, i.e. if the cell remains suitable for a certain time period, e.g., for a third predefined period of time, then it would be considered that the suitability is consistent.

In another embodiment based on FIG. 4, the UE would consider himself a candidate for WiFi offload as soon as the serving cellular cell becomes unavailable for use, e.g. by Access Class Barring or other traffic limitations. The benefit of this is that the UE can then use WiFi without cellular.

Figure 5:
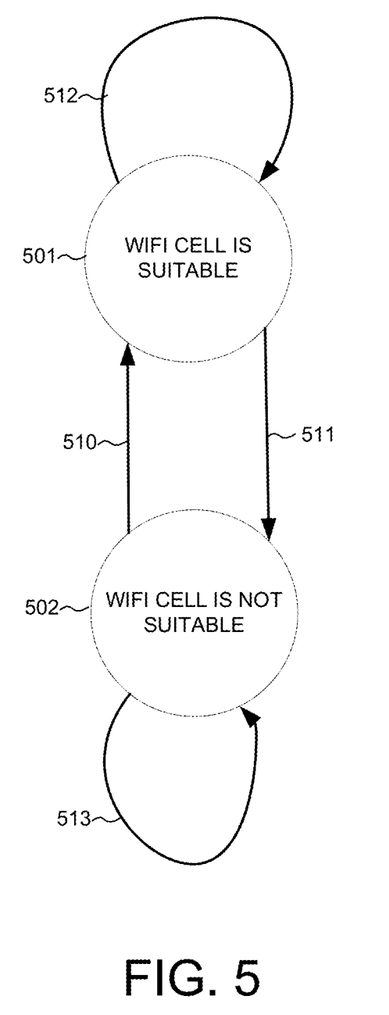
FIG. 5 illustrates a process of determining whether there is a suitable WiFi cell.

FIG. 5 illustrates a process of determining whether there is a suitable WiFi cell. FIG. 5 shows an example of how a UE could determine if a detected WiFi Cell is suitable or not. In this example model, two states or two situations are modeled, either that the WiFi cell is suitable (state 501), or that the WiFi cell is not suitable (state 502). In this document, the word suitable has a composite meaning, considering multiple aspects when determining suitability. A basic criterion for a WiFi cell being suitable is that the WiFi radio signal strength or signal quality need to be good enough. The transition 510 could thus be triggered by WiFi signal strength or signal quality>a fourth threshold. Typically the reverse transition 511 could then be triggered by a condition that WiFi signal strength of signal quality<a fifth threshold, where the fifth threshold could be the fourth threshold+a hysteresis value. The benefit of a hysteresis value would be to prevent fast Ping-Pong between these states or situations.

In a complementary embodiment, a WiFi cell may be considered suitable or non-suitable based on its load or congestion level. For example, the transition 511 could be triggered if the WiFi cell signals a certain load parameter to the UE and the load parameter is above a certain threshold, e.g., a sixth threshold, or that the WiFi cell signals a congestion indication to the UE. On the other hand, if the condition ceases, then this could trigger transition 510.

In a further complementary embodiment, a WiFi cell may be considered suitable or non-suitable based on estimated throughput. For example, the transition 511 could be triggered if the estimated throughput for the WiFi cell is below a certain threshold, e.g., a seventh threshold. If the condition ceases, this could trigger transition 510. Note that this throughput estimation could be based on actual measured throughput. It is not straightforward to come up with a throughput definition that would produce comparable results. Probably the best kind of throughput estimation is based on the throughput that would be seen during a data burst.

In another embodiment, the UE would choose to do offload to WiFi if the estimated throughput for the WiFi Cell is better than the estimated throughput for the 3GPP cell. Such condition could be modeled in several ways. In one example, the WiFi cell is suitable if the estimated throughput of the WiFi cell is higher than the estimated throughput of the 3GPP serving cell(s).

Note that a UE would also apply other conditions in determining if a WiFi cell is suitable, e.g. if the UE is allowed access to this WiFi Cell.

To avoid fast Ping-Pong between the states, in particular for conditions not related to radio signal strength or quality, minimum times could be applied. For example, after state 501 has been entered, the transition 512 is entered for a certain time, e.g., a fourth predefined period of time, preventing a transition 511 during this time. Similarly, after state 502 has been entered, the transition 513 is entered for a certain time, e.g., a fifth predefined period of time, preventing a transition 510 during this time. The fourth and fifth period of time may be the same.

Figure 6:
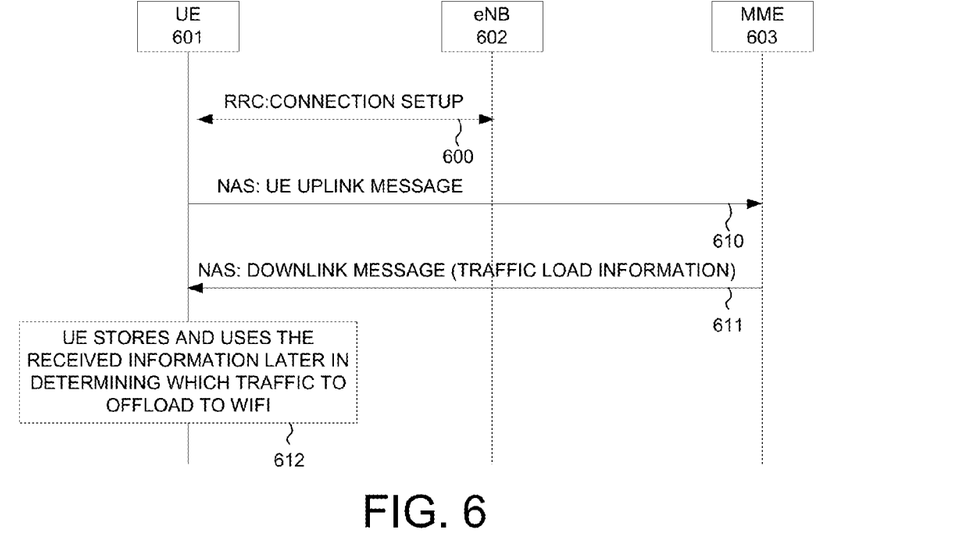
FIG. 6 illustrates one embodiment of a process of determining which traffic can be offloaded to WiFi.

FIG. 6 illustrates one embodiment of a process of determining which traffic can be offloaded to WiFi. In the embodiment of FIG. 6, an example signaling sequence is shown for determining which traffic may be offloaded to WiFi. In step 600, UE 601 establishes an RRC connection with eNB 602 via RRC connection setup. In step 610, UE 601 sends a NAS uplink message to MME 603. In step 611, UE 601 receives a NAS downlink message from MME 603. Finally, in step 612, UE 601 stores the information and uses the received information later in determining which traffic to be offloaded to WiFi.

In this example, information on which traffic may be offloaded is provided by NAS protocol by MME or SGSN. The benefit of providing such information from MME or SGSN directly, although the RAN is in better control of the dynamic offload, is that MME or SGSN is aware of concepts such as APN and IP flows, and aware of the requirements of each traffic flow, whereas RAN is not. If the MME or SGSN is also aware of UE capability, they can provide information to the UE that the UE can use as-is, i.e. which APNs may be offloaded by WiFi, or which IP flows may be offloaded by WiFi in step 612. In case UE has no capability to handle individual IP flows, it can assume that it shall treat all IP flows for a certain APN the same way, and if one flow is offloaded, all flows for this APN shall be offloaded 612. In one example, the NAS downlink message in step 611 from MME 603 may include an EPS Session Management Message, ACTIVATE DEFAULT EPS BEARER CONTEXT ACCEPT; an EPS Session Management Message, ACTIVATE DEDICATED EPS BEARER CONTEXT REQUEST; an EPS Session Management Message, BEARER RESOURCE MODIFICATION REQUEST; or an EPS Session Management Information Element, Traffic flow aggregate description.

Figure 7:
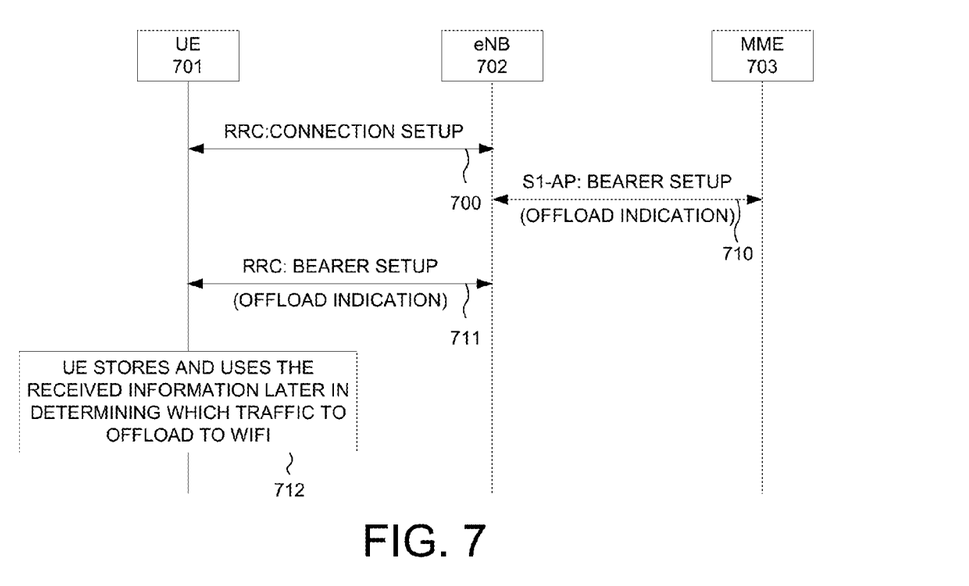
FIG. 7 illustrates another embodiment of a process of determining which traffic can be offloaded to WiFi.

FIG. 7 illustrates another embodiment of a process of determining which traffic can be offloaded to WiFi. In the embodiment of FIG. 7, offload information is provided to UE 701 via RRC signaling by eNB 702. In step 700, UE 701 establishes an RRC connection with eNB 702 via RRC connection setup. In step 710, eNB 702 and MME 703 performs bearer setup via S1-AP. As the RAN is not aware of APN, a simpler way of signaling to the UE may be to just indicate bearer(s) that are candidate for offload to the UE in step 711. UE 701 could then treat all bearers of a certain APN the same way, i.e. if one bearer for a certain APN is indicated as a candidate for WiFi traffic offload, then in step 712, UE 701 treats all traffic of the certain APN as candidate for WiFi offload.

Figure 8:
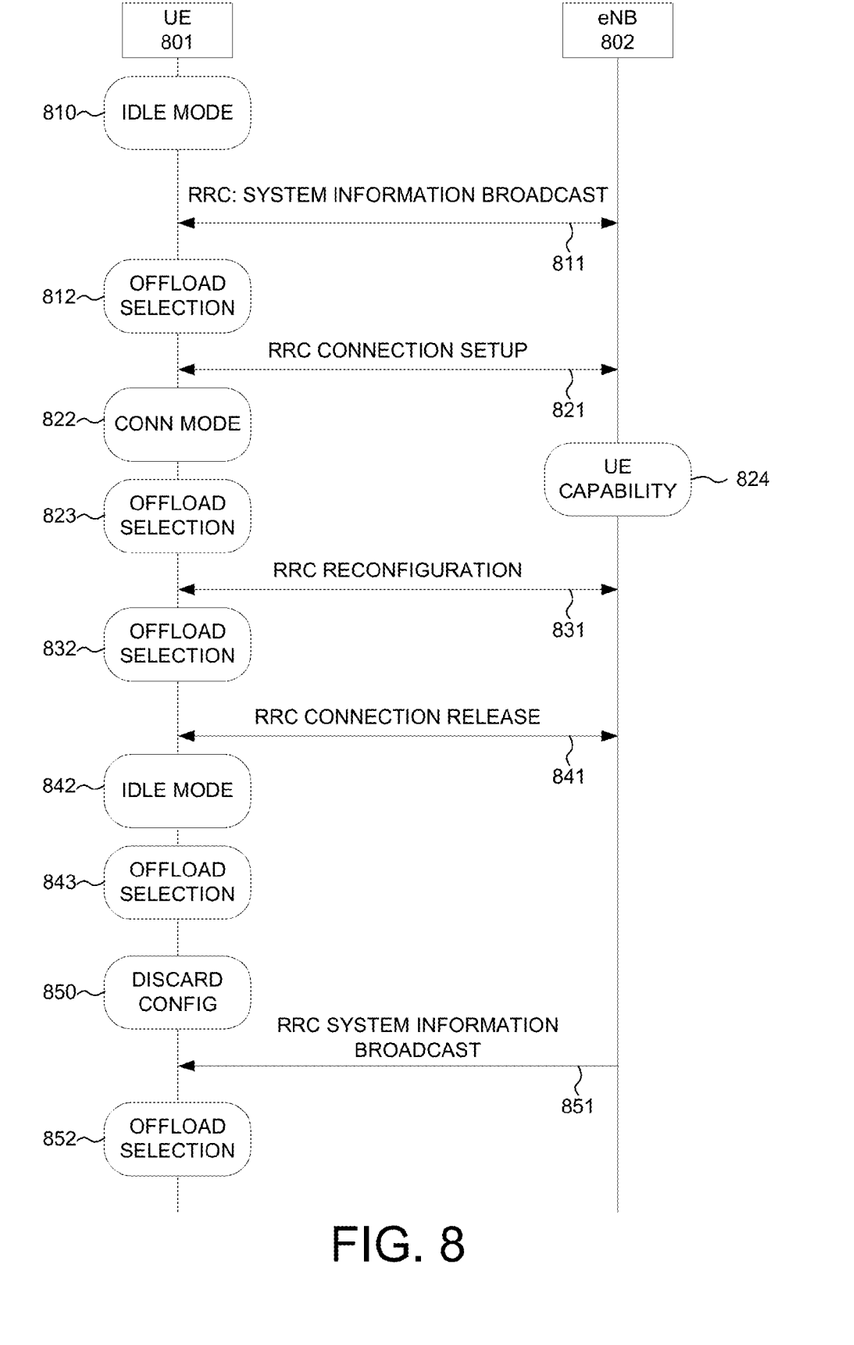
FIG. 8 illustrates how UE receives offload configuration information by different methods.

FIG. 8 illustrates how the UE could handle broadcast and dedicated configurations. First, it is assumed that a configuration for WiFi offload would be applicable consistently regardless if the UE is in RRC Idle Mode or RRC Connected Mode in 3GPP. Second, it is assumed that in order for load balancing to be dynamic and can adapt to load situations, parts of the configuration may change fast. The benefit of using broadcast configuration is that parameters that are dependent on 3GPP RAN load could change and be consistently communicated to all UEs in a Cell regardless its 3GPP state, e.g. if the load in 3GPP RAT is suddenly gone it may be desired to trigger UEs to stop doing WiFi offload and instead go to connected mode in 3GPP RAT. A primary benefit of using dedicated configuration is that 3GPP RAN can identify particular UEs that are good candidates for WiFi offload, or that are good candidates to be kept on 3GPP RAT, e.g. based on service history, or based on Radio Resource Usage. By dedicated configuration, such UEs can be given particular configuration to make it more or less a likely candidate for WiFi offload. With this benefit in mind, it is proposed that such a dedicated configuration must be kept valid also after the UE transits to RRC Idle Mode, and that it must have higher priority than the broadcasted configuration to the extent that they overlap. Thus, it also need to be clear when such dedicated configuration is not valid any more, and when broadcast configuration shall be used instead. For simplicity, it is proposed that a timer can be used, for which the start value can be provided together with the dedicated configuration. The timer starts when the dedicated configuration is received and when the timer expires the dedicated configuration is discarded, see also step 850.

In general, the exemplary signaling sequence starts with a UE 801 in RRC Idle mode (step 810). The UE then receives its first configuration for WiFi offload by broadcast signaling in step 811, and subsequently starts the offload selection process in step 812 to determine if it may perform WiFi offload as a candidate for WiFi offload, and whether there are suitable WiFi cells. The UE later goes to RRC Connected Mode in step 822 after performing an RRC connection setup in step 821. The UE still runs the WiFi offload selection process in step 823 similar to in RRC Idle Mode, using parameters received by broadcast signaling in step 811. We assume that the RAN need to know if the UE is capable to receive dedicated offload configuration or not, see step 824. If the UE is capable, the RAN can then provide a dedicated configuration to the UE in step 831. The UE then uses a received start value and starts a discard timer for the dedicated WiFi offload configuration received in step 831. The UE further replaces its stored broadcast parameters with parameters received in dedicated configuration and runs the offload selection process in step 832 using those parameters. After the UE is released to RRC Idle Mode in step 842 after performing an RRC Connection Release in step 841, the UE still performs Offload selection in step 843 using the dedicated parameters. At a certain point in time, the dedicated configuration discard timer expires and the dedicated configuration is discarded in step 850. Then the UE instead applies configuration parameters provided by broadcast signaling again in step 851, and performs offload selection in step 852.

It can be generally assumed that a new dedicated configuration overwrites an old one. There is a general problem that if a UE connects to a 3GPP cell after Idle mode, the 3GPP cell cannot know what WiFi offload configuration the UE is currently using. Therefore, if the 3GPP RAN provides a new dedicated configuration it may be distinctly different from the first one, causing Ping-Pong situation. For example, a first eNB providing a dedicated configuration to do WiFi offload due to heavy load, and in a second eNB, there is no load because all traffic is already offloaded. As a result, the second eNB reverts to another configuration that causes the UE to switch the heavy traffic back to 3GPP and so on so forth. If the RAN nodes are well synchronized by implementation and OAM (operation administration and maintenance), then there is little risk of such Ping-Pong behavior. However, if they are not well synchronized, then there could very well be a Ping-Pong problem.

In one embodiment, a UE is performing WiFi offload and is then connecting to a 3GPP cell. The UE informs the RAN that WiFi offload is ongoing. The RAN could then consider this information, typically to avoid doing dedicated reconfigurations to trigger offload, as offload is already ongoing. In An alternative or complementary embodiment, a UE already has a dedicated configuration that was received in a previous cell. The UE is performing offload selection, and then the UE goes to connected mode. The UE then provides information about its dedicated offload configuration to the RAN. The simplest kind of information is just a Boolean information that a dedicated configuration exist. A more sophisticated variant could include that the UE reports the details of the configuration and/or its current WiFi offload configuration discard timer value.

Figure 9:
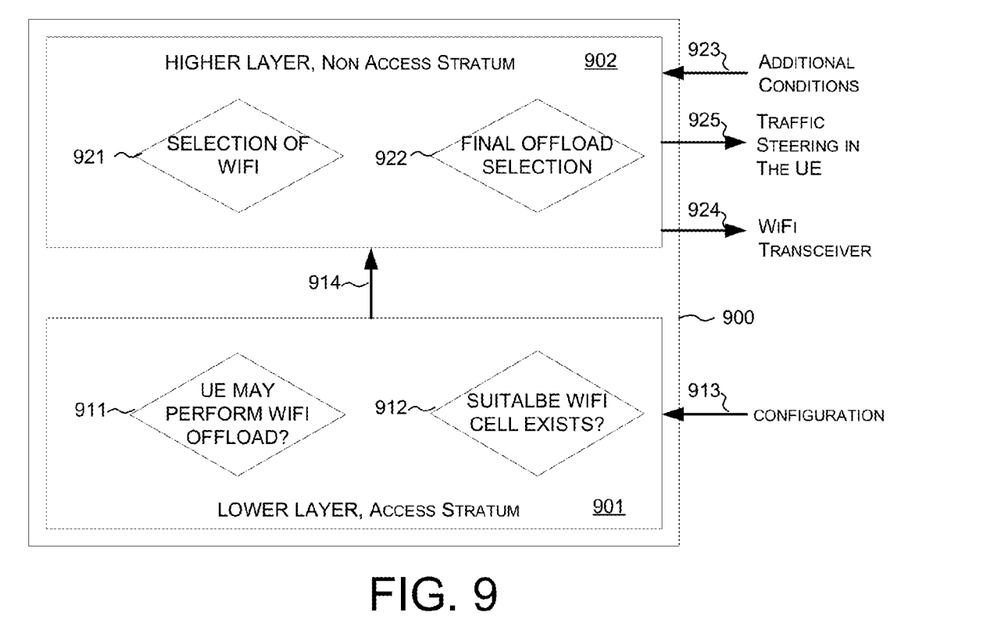
FIG. 9 illustrates a variant of the invention in a realistic architectural context for 3GPP.

FIG. 9 illustrates a variant of the present invention in a realistic architectural context for 3GPP. The functionality to do offload selection in UE 900 is split between two layers, a lower layer, the Access Stratum 901 and a higher layer, the non-Access-Stratum 902. In this embodiment, the Access Stratum 901 is the receiver of the configuration that controls the offload selection in step 913. Based on the configuration, measurements and indications, the Access Stratum 901 determines if the UE may perform WiFi offload in step 911, and determines if there exists any suitable WiFi Cells in step 912. The result of the processing in the Access Stratum is indicated to higher layer 902 in step 914. In case it is indicated that WiFi offload shall be done, a list of suitable WiFi cells is also indicated. It could also be indicated that WiFi offload shall not be done. The non-access stratum 902 would do the additional logical processing needed to do final offload decision in step 922, e.g. take into account the determination of which traffic shall be offloaded, take into account additional conditions 923 going outside of this invention such as user settings or conditions imposed by other traffic steering functionality in the UE, such as ANDSF (access network detection and selection function). The non-access stratum 902 would also trigger and control final selection of WiFi cell in step 921, according to WiFi standards, based on the list of WiFi cells indicated by the Access stratum 901, and by invoking the WiFi transceiver in step 924. When final offload decision in step 922 and Selection of WiFi in step 921 is done, traffic can be steered accordingly in step 925.

Note that a UE that performs WiFi offload has handed over part or all of the traffic to WiFi so that data of the handed over traffic is transmitted and/or received on WiFi. On the other hand, a UE that does not perform WiFi offload receives and transmits all its traffic on the 3GPP Radio Access Technology. The methods described herein to start and stop WiFi offload are complementary to other methods in a UE and in a network to start and stop usage of WiFi to carry traffic.

Figure 10:
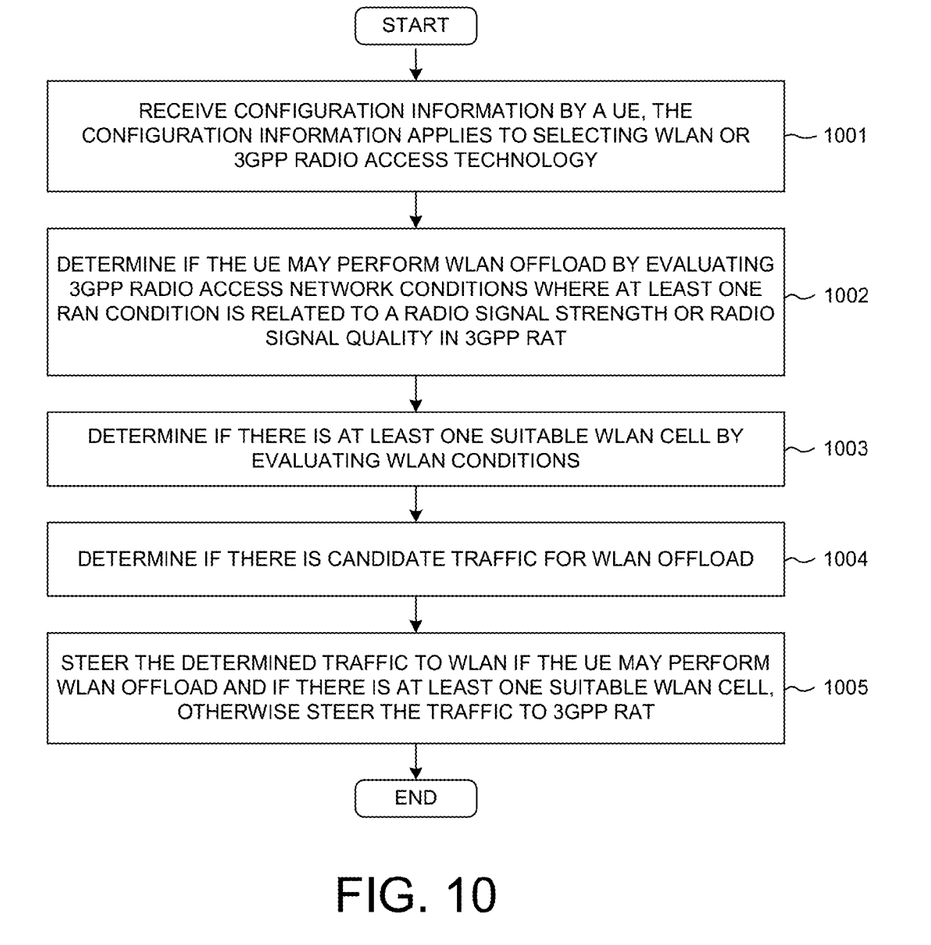
FIG. 10 is a flow chart of a method of offload selection in accordance with one novel aspect.

FIG. 10 is a flow chart of a method of offload selection in accordance with one novel aspect. In step 1001, a UE receives configuration information that applies to selecting WLAN or 3GPP radio access technology (RAT). In step 1002, the UE determines if the UE may perform WLAN offload (e.g., whether the UE is a candidate for offload) by evaluating 3GPP radio access network (RAN) conditions where at least one RAN condition is related to a radio signal strength or a radio signal quality in 3GPP RAT. In step 1003, the UE determines if there is at least one suitable WLAN cell by evaluating WLAN conditions. In step 1004, the UE determines if there is candidate traffic for WLAN offload. In step 1005, the UE steers the determined traffic to WLAN if the UE may perform WLAN offload and if there is at least one suitable WLAN cell, otherwise steer the traffic to 3GPP RAT.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving configuration information by a user equipment (UE), the configuration information applies to selecting wireless local area network (WLAN) or 3GPP Radio Access Technology (RAT);
determining if the UE may perform WLAN offload by evaluating 3GPP Radio Access Network (RAN) conditions where at least one RAN condition is related to a radio signal strength or radio signal quality in 3GPP RAT;
determining if there is at least one suitable WLAN cell by evaluating WLAN conditions;
receiving additional conditions from a Mobility Management Entity (MME) via Non-Access Stratum (NAS) signaling in response to an uplink NAS message sent to the MME;
determining if there is candidate traffic for WLAN offload based on the additional conditions; and
steering the determined candidate traffic to WLAN if the UE may perform WLAN offload and if there is at least one suitable WLAN cell, otherwise steering the determined traffic to 3GPP RAT.

2. The method of claim 1, wherein the UE determines that the UE may perform WLAN offload if the radio signal strength or radio signal quality measured in 3GPP RAT is below a first threshold, and wherein the configuration information is received via Access Stratum signaling.

3. The method of claim 2, wherein the UE remains a candidate for WLAN offload for at least a first predefined period of time after determining that the UE may perform WLAN offload.

4. The method of claim 1, wherein the UE determines that the UE may not perform WLAN offload if the signal strength or the signal quality measured in 3GPP RAT is above a second threshold.

5. The method of claim 4, wherein the UE remains a non-candidate for WLAN offload for at least a second predefined period of time after determining that the UE may not perform WLAN offload.

6. The method of claim 1, where the signal strength or signal quality measured in the 3GPP RAT is subject to filtering that is specific for determining if the UE may perform WLAN Offload.

7. The method of claim 1, wherein the UE determines that the UE may perform WLAN offload if a randomly selected number is below or above a third threshold.

8. The method of claim 1, wherein the UE determines that the UE may perform WLAN offload if the UE has a high or medium speed and a specific WLAN cell has remained suitable for a third period of time.

9. The method of claim 1, wherein the UE determines that a WLAN cell is suitable if a measured WLAN signal strength or signal quality is above a fourth threshold.

10. The method of claim 1, wherein the UE determines that a WLAN cell is non-suitable if a measured WLAN signal strength or signal quality is below a fifth threshold.

11. The method of claim 1, wherein the UE determines that a WLAN cell is suitable if a load indicator received from the WLAN cell is below a sixth threshold.

12. The method of claim 1, wherein the UE determines that a WLAN cell is suitable if an estimated throughput on a WLAN cell is better than an estimated throughput of a serving 3GPP cell.

13. The method of claim 1, wherein the UE determines that a WLAN cell is non-suitable if an estimated throughput on the WLAN cell is worse than a seventh threshold.

14. The method of claim 1, wherein the determining of whether a WLAN cell is suitable involves using a time filtering based on a fourth predefine period of time.

15. The method of claim 1, wherein the UE determines which traffic is a candidate for WLAN offload based on a NAS configuration from a mobility management entity (MME) that indicates which APN or which EPS bearers or which IP flows are candidates for WLAN offload, wherein the NAS configuration includes an EPS session management message to activate or modify a dedicated EPS bearer context.

16. The method of claim 1, wherein the configuration information comprises at least one of a first threshold indicating a first 3GPP RAN condition, a second threshold indicating a second 3GPP RAN condition, a fourth threshold indicating a first WLAN condition, a fifth threshold indicating a second WLAN condition, a sixth threshold indicting a WLAN load, a first predefine period of time indicating a minimum time the UE remains a candidate for WLAN offload, and a second predefined period of time indicating a minimum time the UE remains a non-candidate for WLAN offload.

17. The method of claim 1, wherein the configuration information further comprises at least one of a third threshold of a randomly generated number, a seventh threshold indicating a minimum estimated throughput, a third predefined time for determining if a WLAN cell is suitable when the UE has a high or medium speed, and a fourth predefined time indicating a minimum time a WLAN cell remains suitable.

18. The method of claim 1, wherein the UE receives the configuration information from broadcast signaling or by dedicated signaling.

19. The method of claim 18, wherein the UE applies the dedicated configuration for a validity time during which the dedicated configuration is valid.

20. The method of claim 18, wherein the UE applies the dedicated configuration also after having been released to RRC Idle Mode.

21. A user equipment (UE), comprising:
a receiver that receives configuration information, the configuration information applies to selecting wireless local area network (WLAN) or 3GPP Radio Access Technology (RAT);
a 3GPP control module that determines if the UE may perform WLAN offload by evaluating 3GPP Radio Access Network (RAN) conditions where at least one RAN condition is related to a radio signal strength or radio signal quality in 3GPP RAT;
a WLAN control module that determines if there is at least one suitable WLAN cell by evaluating WLAN conditions;
a traffic control module that receives additional conditions from a Mobility Management Entity (MME) via Non-Access Stratum (NAS) signaling in response to an uplink NAS message sent to the MME and determines if there is candidate traffic for WLAN offload; and
a WLAN-offload module that steers the determined candidate traffic to WLAN if the UE may perform WLAN offload and if there is at least one suitable WLAN cell, otherwise steers the determined traffic to 3GPP RAT.

* * * * *